United States Patent [19]

Lapera

[11] 3,722,218
[45] Mar. 27, 1973

[54] AIR BOOST FUEL ATOMIZING SYSTEM

[75] Inventor: Dominic J. Lapera, Chardon, Ohio

[73] Assignee: Parker-Hannifin Corporation, Cleveland, Ohio

[22] Filed: Dec. 4, 1970

[21] Appl. No.: 95,312

[52] U.S. Cl. .............................60/39.74 R, 60/39.14
[51] Int. Cl. ................................................F02g 1/00
[58] Field of Search ........60/39.74, 39.14; 417/2, 62, 417/286, 287

[56] References Cited

UNITED STATES PATENTS

| | | | |
|---|---|---|---|
| 3,095,707 | 7/1963 | Flanigan et al. | 60/39.74 |
| 3,581,493 | 6/1971 | Sweet | 60/39.74 |
| 2,941,790 | 6/1960 | Compton et al. | 60/39.14 |
| 2,996,882 | 8/1961 | Barton | 60/39.74 |
| 3,426,527 | 2/1969 | O'Connor | 60/39.14 |
| 3,048,014 | 8/1962 | Schmibt | 60/39.14 |
| 2,813,231 | 11/1957 | Hyde | 417/2 |
| 2,472,802 | 6/1949 | Bentley | 417/212 |

Primary Examiner—Carlton R. Croyle
Assistant Examiner—Warren Olsen
Attorney—Oberlin, Maky, Donnelly & Renner

[57] ABSTRACT

An air boost fuel atomizing system for a gas turbine engine or the like operative to supply compressed air to atomizing fuel injection nozzles during starting of the engine until the engine compressor discharge pressure exceeds the combustion chamber pressure by a prescribed amount such as to obtain efficient atomization and combustion of the fuel on compressor air alone, and when that occurs at say, 80 percent of the maximum turbine shaft speed which may vary from engine to engine, the air boost fuel atomizing system is de-energized. In one system according to this invention, the boost blower or compressor is in series between the engine compressor and the fuel-air manifold so as to deliver to the latter increased air pressure as required during starting of the engine and until the engine attains a predetermined speed, after which the engine compressor discharge pressure is itself sufficient to sustain efficient atomization and combustion. In another system according to the present invention, the boost compressor has an atmospheric intake port and a discharge port communicating with a high pressure air reservoir from which air is conducted to the fuel-air manifold via a pressure regulator during starting of the engine and until the engine compressor air is of sufficient magnitude to sustain efficient atomization and combustion at which time the air boost system is de-energized.

10 Claims, 3 Drawing Figures

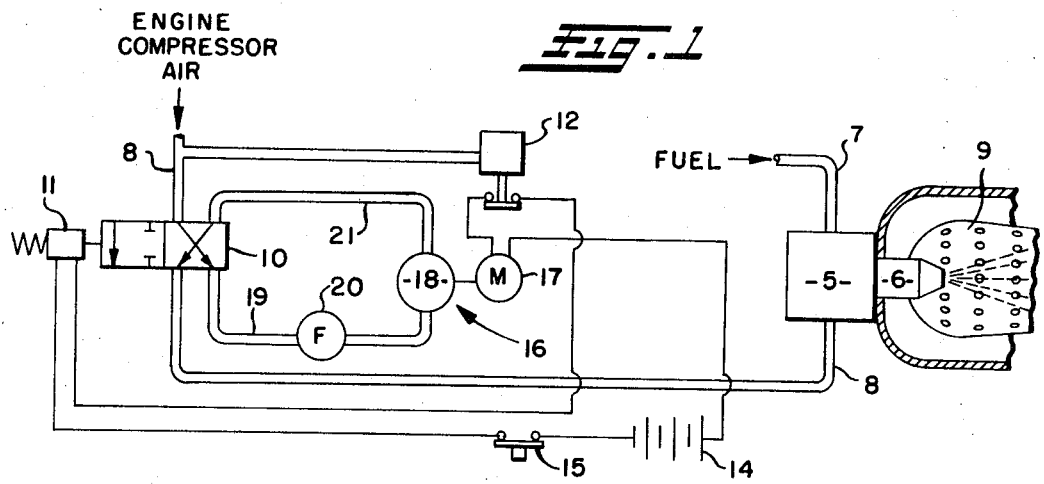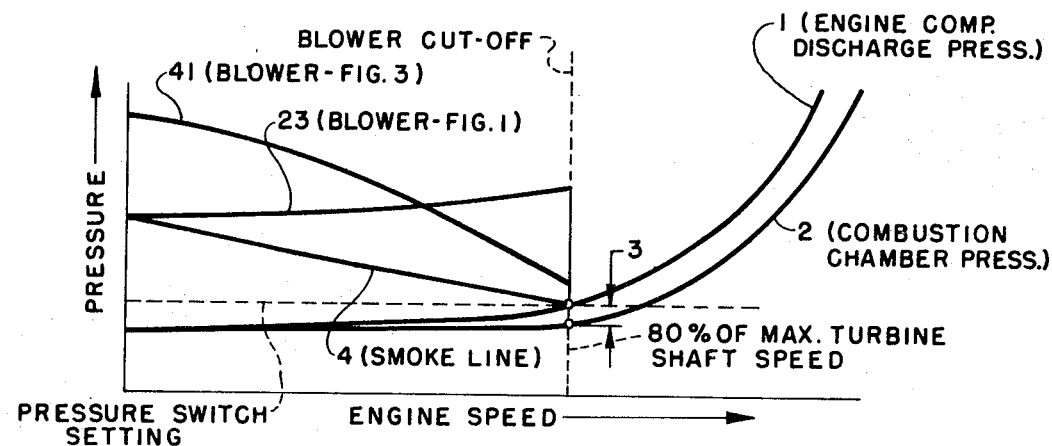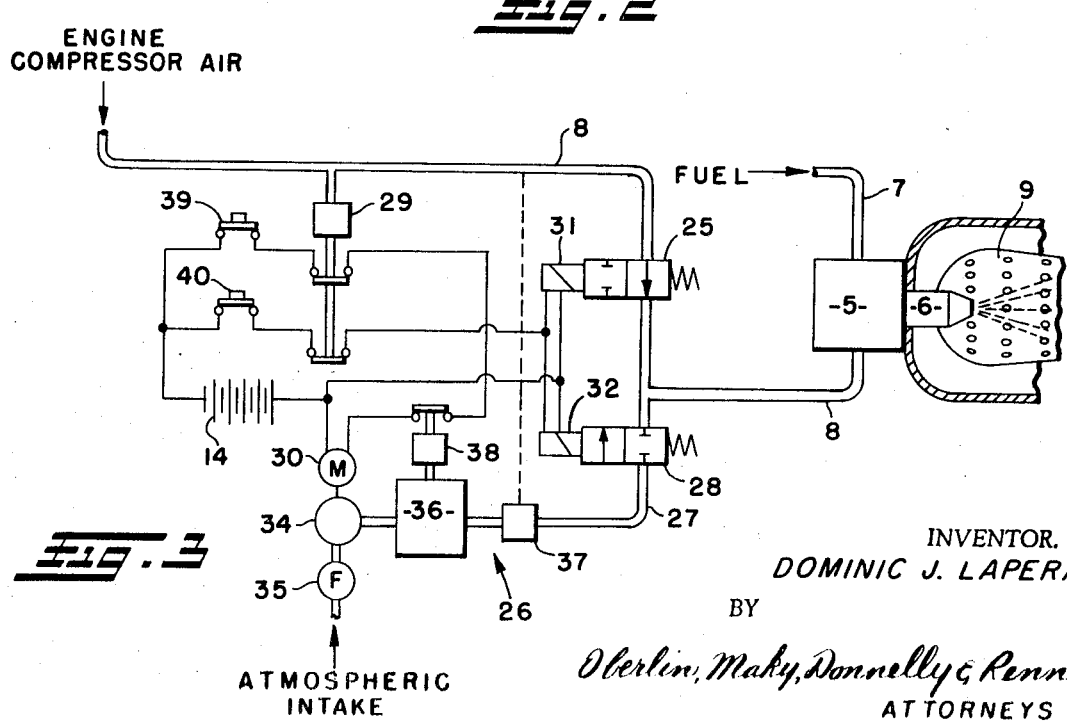

AIR BOOST FUEL ATOMIZING SYSTEM

BACKGROUND OF THE INVENTION

In air-atomizing fuel nozzles the degree of fuel atomization produced is dependent on the air velocity through the fuel nozzle, which is a direct function of the air pressure difference between the inlet to the nozzle and the ambient atmospheric pressure into which the fuel nozzle discharges. In conventional fuel nozzles of this kind the inlet pressure is the engine compressor discharge pressure and the outlet ambient is the combustion chamber pressure, the difference between the former and the latter being due to the pressure loss across the combustion chamber lines.

In gas turbine engines employing air atomizing fuel nozzles when the engine crank starter is engaged, the pressure difference between the engine compressor discharge pressure and the combustion chamber pressure is insufficient to produce efficient atomization for combustion until the engine reaches a relatively high speed, for example, about 80 percent of the maximum turbine shaft speed, and hence during periods of starting the engine may have a smoky exhaust due to insufficient air for atomization and combustion. Generally, the smoke region is the area below an air pressure vs. engine speed curve which slopes downwardly from zero engine speed to approximately meet the upwardly sloping curves of the engine compressor and combustion chamber pressures at about 80 percent of maximum turbine shaft speed and, therefore, without an air boost system, smoky engine exhaust is encountered until such 80 percent speed is reached.

SUMMARY OF THE INVENTION

It is accordingly an object of this invention to provide an air boost fuel atomizing system to provide during the starting period of a gas turbine engine an increased air pressure to the fuel nozzle such that the air pressure vs. speed curve during this period is above the aforementioned smoke curve so that the gas turbine engine may be efficiently operated during starting and during acceleration until such time that the pressure drop between the engine compressor discharge pressure and the combustion chamber pressure is sufficient to maintain efficient operation of the engine.

It is another object of this invention to provide an air boost atomizing system which is energized when the engine is started and which is automatically de-energized when the engine compressor discharge pressure reaches a prescribed value.

It is another object of this invention to provide an air boost atomizing system in which an independently driven air compressor boosts the engine compressor discharge pressure to supply increased air pressure to the fuel-air manifold, the drive motor aforesaid which can be electric or hydraulic being de-energized responsive to engine compressor air pressure discharge pressure reaching a prescribed value sufficient to continue engine operation efficiently without the boost system.

It is yet another object of this invention to provide an air boost atomizing system which utilizes a separate motor driven boost compressor which fills a high pressure air reservoir or accumulator from which air is conducted through a pressure regulator to the fuel-air manifold during starting periods of the engine when the engine compressor discharge pressure is insufficient for efficient atomization for combustion, the drive motor being de-energized in response to either engine compressor discharge pressure or reservoir pressure reaching a prescribed value which is sufficient to maintain efficient combustion.

Other objects and advantages of the present invention will appear hereinafter.

BRIEF DESCRIPTION OF THE DRAWING

FIG. 1 is a schematic diagram of an air boost atomizing system embodying the present invention;

FIG. 2 is a graph plotting air pressure versus engine speed for engine compressor discharge pressure, for combustion chamber pressure, and for boosted pressure; and FIG. 3 is a schematic diagram of another air boost atomizing system embodying the present invention.

DETAILED DESCRIPTION OF THE DRAWING

Referring first to FIG. 2 wherein the coordinates are air pressure and engine speed, the curve 1 represents the engine compressor discharge pressure, the curve 2 represents the combustion chamber pressure, and the dimension 3 represents the minimum pressure drop between engine compressor discharge pressure and combustion chamber pressure which will sustain efficient operation of the engine. For this example a figure of 80 percent of maximum turbine shaft speed will be used.

The curve 4, FIG. 2, is what may be termed the smoke line or minimum performance line and if the air pressure is below that line up to about 80 percent of maximum turbine shaft speed, the engine will not operate efficiently and will produce a smoky exhaust. As apparent from FIG. 2, the portions of the curves 1 and 2 up to 80 percent of maximum turbine shaft speed are in the smoke region and hence, without the air boost atomizing system herein, smoking of the engine is inevitable during starting and until the engine reaches the speed whereat the pressure drop 3 is of required value for efficient combustion. In some cases, engine starting may not be obtained.

Referring now in detail to the air boost atomizing system illustrated in FIG. 1, the reference numeral 5 denotes the fuel-air manifold having a plurality of air atomizing fuel injection nozzles 6 thereon, one of which is shown in FIG. 1 and having a fuel pressure supply line 7 and an air supply line 8 connected thereto, the fuel and air passages in the manifold leading to the respective nozzles 6 so that the air assists in atomizing of the fuel for spraying into the combustion chamber 9 in finely divided atomized form usually in the form of a hollow cone.

In the engine compressor air line is a solenoid operated valve 10 so constructed that when the solenoid 11 thereof is deenergized, air pressure is supplied to the fuel-air manifold 5 only from the engine air compressor (not shown), and at that time the engine compressor discharge pressure is sufficient to actuate the pressure switch 12 to open position to deenergize the solenoid 11. The reference numeral 14 denotes a source of electric power and a main operating switch 15 is closed when it is desired to operate the auxiliary air compressor 16 herein when the gas turbine engine is to be started. When switch 15 is closed, the motor 17 is energized through closed pressure switch 12 to drive the boost blower or compressor 18 and the solenoid 11 is energized to shift the valve 10 to the position shown. The blower or compressor 18 has an intake line 19 connected to the valve 10 via a filter 20 and a discharge line 21 also connected to the valve 10 in such manner that when the solenoid 11 and the motor 17 are energized, the boost compressor 18 is in series between the engine compressor and the fuel-air manifold 5. In this way, the air pressure is boosted during the starting period as represented by the curve 23 in FIG. 2, which is above the smoke line 4, and therefore, the engine will be efficiently operated with little or no smoke during the starting period and until the engine speed reaches the value where the air pressure drop 3 is of value to sustain efficient combustion. When the pressure drop 3 is reached, at say, 80 percent of maximum turbine shaft speed, the compressor motor 17 is deenergized by the opening of the pressure switch 12 and at the same time the solenoid 11 is de-energized so that the valve 10 will shift to the right as viewed in FIG. 1 to isolate the boost system 16 and to cause air to be supplied to the fuel-air manifold 5 directly from the engine compressor.

In the air boost atomizing system illustrated in FIG. 3, there is again provided the fuel-air manifold 5 and nozzles 6 to which the fuel and air supply lines 7 and 8 are connected. The engine compressor supply line 8 has therein a normally open solenoid operated valve 25 and the boost system 26 air supply line 27 has a normally closed solenoid operated valve 28 therein.

The engine compressor air supply line 8 upstream of the valve 25 has a pressure switch 29 therein with contacts in the motor 30 and solenoid 31 and 32 circuits.

The motor operated boost blower or compressor 34 has an intake for atmospheric air via the filter 35 and has a discharge communicating with a high pressure air reservoir or accumulator 36 which has a differential pressure regulator 37 at its outlet and the regulator outlet is connected to the valve 28 as shown. The regulator is biased to engine compressor discharge so that its differential is set above combustion chamber pressure. The reservoir 36 has a pressure switch 38 thereon which de-energizes the motor 30 whenever the reservoir 36 is charged with predetermined air pressure such as 55 to 60 psi, for example, which is substantially greater than the air pressure required to be conducted to the fuel-air manifold 5 via the regulator 37 and the solenoid operated valve 28 under starting conditions of the gas turbine engine. The setting of pressure switch 38, is always set higher (by a value of say 5 psi) that the combustion chamber pressure at the blower cut off speed.

When the engine is to be started, if the pressure in the reservoir 36 is less than desired, the switch 39 may be closed to energize the motor 30 so as to operate the compressor 34 to build up the desired pressure in the reservoir 36 so that when the engine is started, a large volume of air may be conducted to the fuel-air manifold 5 to maintain the desired pressure above the smoke line 4. When the engine is to be started the switches 39 and 40 are closed and because the pressure switch 29 is closed, both solenoids 31 and 32 will be energized to close the valve 25 and to open the valve 28, whereby air is supplied to the fuel-air manifold 5 through the boost system 26 in the manner indicated by the curve 41 which is above the smoke line 4. In certain installations, valves 28 and 25 may be interchanged as desired by making compatible switch wiring alterations.

When the engine speed increases to result in the pressure drop 3, the air pressure in the engine compressor supply line 8 will be sufficient to actuate the pressure switch 29 to open both sets of contacts to de-energize the solenoids 31 and 32, and therefore the valve 25 will be opened and the valve 28 will be closed. Thereafter the engine is supplied with air solely from the engine compressor flowing through the conduit 8, and the normally open valve 25 to the manifold 5. The auxiliary compressor 34 will continue to run until the reservoir 36 is changed to a preset pressure wherein switch 38 will then shut off the motor, if the upper contacts of switch 29 are jumped.

As can now be seen, the FIG. 3 system may be referred to as a capacitive system which does not require close matching of the auxiliary or boost air supply to the engine speed and consequently the power required to drive the FIG. 3 system is considerably less than other systems wherein the auxiliary air supply must be sufficient to take care of maximum air demands. For example, the FIG. 3 system requires but about one-eighth the power of say, the FIG. 1 system because of the ability of the reservoir 36 to take care of varying air demands and surges. The valves 25 and 28 in FIG. 3 are preferably two-way solenoid valves to provide for quick response when the solenoids 31 and 32 thereof are energized and de-energized.

The curve 41 in FIG. 2 represents a typical characteristic of the FIG. 3 boost system 26 and, as in connection with the curve 23 for the FIG. 1 boost system, the curve 41 is above the smoke line 4 so that efficient clean burning of the fuel is achieved during the starting period.

Of course, in both forms of the invention herein disclosed the air boost pressure is below the flame blowout line (not shown) so that there is no danger of extinguishing the flame during the engine starting period due to high air velocities in the combustion chamber which may either lean out the fuel-air mixture to non-ignitable levels and/or blow the mixture away from the ignition source.

I, therefore, particularly point out and distinctly claim as my invention:

1. An air boost fuel atomizing system for a gas turbine engine of the type having an engine driven compressor to supply air under pressure to air atomizing fuel nozzles disposed in the combustion chamber of said engine, said system comprising a boost compressor operative to supply increased air pressure to said nozzles during starting of said engine; valve means operative in response to increase of engine compressor discharge pressure to a predetermined value to open communication between said engine compressor and said nozzles and to close communication between said boost compressor and said nozzles for continued operation of said engine with engine compressor air; and pressure switch means in the air supply line between said valve means and said engine compressor operative to energize said valve means to close communication between said engine compressor and said nozzles and to open communication between said boost compressor and said nozzles whereby increased air pressure is supplied to said nozzles during the starting period of the engine until said pressure switch means is actuated by increased engine compressor discharge pressure reaching such predetermined value at which time said valve means is de-energized for continued operation of said engine with engine compressor air.

2. The system of claim 1 wherein the outlet of said boost compressor is communicated with an air pressure reservoir having an outlet communicated with said nozzles via said valve means.

3. The system of claim 1 wherein said valve means opens and closes communication between said engine compressor and said manifold and closes and opens communication between said manifold and said boost compressor responsive to engine compressor discharge pressure being of such predetermined magnitude or less than such predetermined magnitude.

4. The system of claim 2 wherein a differential pressure regulator downstream of said reservoir regulates the increased air pressure supplied to said nozzles over a predetermined air pressure schedule.

5. The system of claim 2 wherein said reservoir has pressure switch means associated therewith operative to de-energize said boost compressor whenever the pressure built up in said reservoir attains a predetermined value.

6. An air boost fuel atomizing system for a gas turbine engine of the type having an engine driven compressor to supply air under pressure to a fuel-air manifold including air atomizing fuel nozzles disposed in the combustion chamber of said engine; said system comprising a boost compressor operative to supply increased air pressure to said manifold during the starting period of said engine and until the engine reaches an operating speed whereat the engine compressor discharge pressure is of predetermined magnitude; and means responsive to increased engine compressor discharge pressure at such operating speed to communicate said manifold with said engine compressor; said last-named means comprising solenoid operated valve means to open and close communication between said engine compressor and said manifold and to close and to open communication between said manifold and said boost compressor; said valve means, when energized, closing communication between said manifold and said engine compressor and opening communication between said manifold and said boost compressor.

7. The system of claim 6 wherein a pressure switch responsive to engine compressor discharge pressure is operative to de-energize said valve means to open communication between said manifold and said engine compressor and to close communication between said manifold and said boost compressor when the engine compressor discharge pressure increases to such predetermined value.

8. The system of claim 7 wherein said pressure switch means also de-energizes said boost compressor when said valve means is de-energized as aforesaid.

9. An air boost fuel atomizing system for a gas turbine engine of the type having an engine driven compressor to supply air under pressure to air atomizing fuel nozzles disposed in the combustion chamber of said engine, said system comprising a boost compressor and drive means therefor operative to supply increased air pressure to said nozzles during starting of said engine; and means responsive to increase of engine compressor discharge pressure to a predetermined value to deenergize said boost compressor drive means for continued operation of said engine with engine compressor air; and valve means in the air supply line between said engine compressor and said nozzles operative to communicate the boost compressor intake with said engine compressor supply line and the boost compressor outlet with said nozzles to place said boost compressor in series with said engine compressor thus to boost the air pressure supplied to said nozzles; said valve means being actuatable to a position to communicate the air supply line from said engine compressor with said nozzles; said means responsive to engine compressor discharge pressure effecting actuation of said valve means to the last-mentioned position.

10. An air boost fuel atomizing system for a gas turbine engine of the type having an engine driven compressor to supply air under pressure to air atomizing fuel nozzles disposed in the combustion chamber of said engine, said system comprising a boost compressor and drive means therefor operative to supply increased air pressure to said nozzles during starting of said engine; solenoid operated valve means in the air supply line leading to said nozzles operative in one position to communicate the boost compressor outlet with said nozzles and in another position to communicate said engine compressor with said nozzles; and pressure switch means responsive to increase of engine compressor discharge pressure to a predetermined value at a predetermined engine speed to de-energize said boost compressor drive means and said valve means to actuate the latter to said another position for continued operation of said engine with engine compressor air.

* * * * *